UNITED STATES PATENT OFFICE.

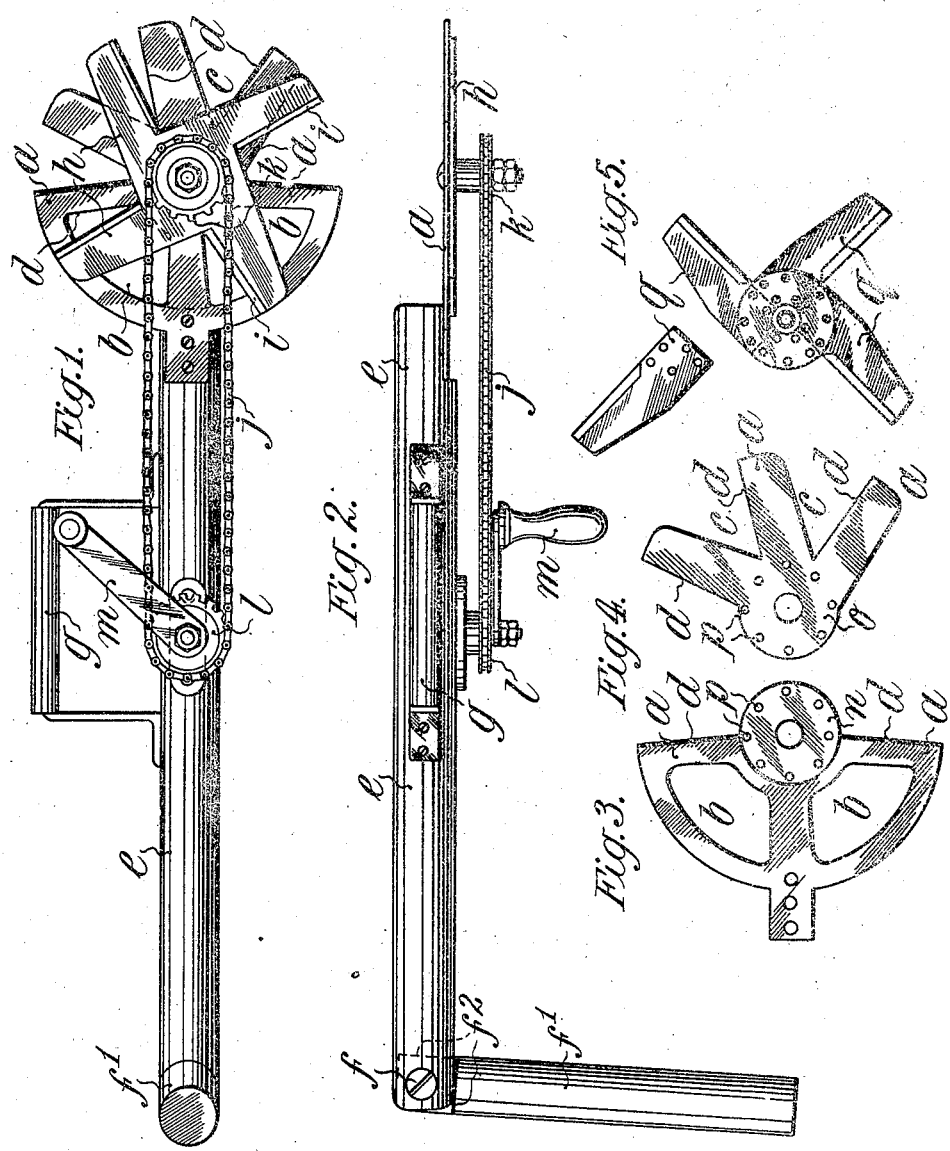

CHARLES FREDERICK WAGNER, OF FINSBURY PARK, LONDON, ENGLAND.

SHEARS ESPECIALLY APPLICABLE FOR HEDGE-CUTTING AND THE LIKE.

1,151,913.     Specification of Letters Patent.     Patented Aug. 31, 1915.

Application filed March 27, 1914. Serial No. 827,676.

*To all whom it may concern:*

Be it known that I, CHARLES FREDERICK WAGNER, a subject of His Majesty the King of England, residing at 34 Tollington Place, Finsbury Park, in the county of London, Kingdom of England, have invented certain new and useful Improvements in Shears Especially Applicable for Hedge-Cutting and the like, of which the following is a specification.

This invention relates to manually or power driven shears for hedge cutting and the like of the kind in which a pair of cutting plates are employed; one of the plates being fixed, the other being removably secured and rotatably mounted over the said fixed plate to coöperate therewith to produce a shearing action. Heretofore it has been proposed to construct such shears with a suitable arm carrying the fixed cutting plate at its forward end, a crank handle and tooth wheel mounted approximately central of said arm, a chain connecting said tooth wheel with a spur wheel on the end of the arm to cause the rotating cutter plate to revolve, a hand grip formed on said arm intermediate of its ends and a rest at the rear end of the arm. It has also been proposed in the construction of a revolving cutter for clipping and shearing apparatus to mount separately or in groups, a number of radially arranged blades upon a central disk or plate by means of screws.

Now the present invention which consists in the improved construction, arrangement, and combination of parts hereinafter pointed out in the claim is chiefly distinguished from other devices of the kind in the construction of the fixed cutter in two parts and also in the provision of a pivotally mounted rest on the end of the arm of the device.

Referring to the accompanying drawings, Figure 1 is a plan view of the device; Fig. 2 is an elevation thereof, and Figs. 3, 4 and 5 show modified forms of blades.

According to my invention I form the fixed cutter in two parts as shown in Figs. 3 and 4, and I provide a plurality of teeth or blades $a$ on each part by removing therefrom a number of sector and V-shaped pieces $b$ and $c$ respectively. These teeth are suitably tapered and sharpened on one side to form cutting edges $d$. One part of the fixed blades thus formed are attached to a suitable arm or handle $e$ one end $f'$ of which is jointed at $f$ to turn either backward or forward, so that its end $f^2$ can abut against the handle $e$ and enable it to be held firmly against the body or shoulder of the operator, the said arm being also provided with a separate handle $g$ about midway of its length, for the purpose of enabling the shears to be held firmly when in operation. Acting in conjunction with the fixed blades $a$ and rotatably mounted therewith is a plate having a plurality of blades $h$ provided with cutting edges $i$ disposed in relation to the cutting edges of the fixed teeth or blades so as to produce a shearing action when the blades $h$ are rotated.

The plate or disk carrying the blades $h$ is provided with a chain wheel or pulley $k$ and is adapted to be driven through the medium of a chain, belt, or cord $j$ from a second chain wheel or pulley $l$ mounted on any suitable part of the arm so as to be turned by means of a crank handle or the like $m$. I could also provide additional chain wheels or pulleys of various diameters on the disk and handle so that the speed could be varied by moving the chain or belt from one pair of chain wheels or pulleys to the other. In place of the chain $j$, I might also employ a cord or belt and with such an arrangement that it would then be possible to twist the belt so that the wheels corresponding to those $k$ and $l$ would be disposed in planes at right angles to one another with the cutter blades then horizontal.

The cutter shown in Figs. 3 and 4 are as before described made in two parts $n$, $o$ which are adapted to be secured together by screws or the like passing through holes $p$, while the rotating blades $q$ may if desired be separately attached to a central plate as shown in Fig. 5, instead of being made in one piece as in Fig. 1.

My improved shears are especially suitable for cutting the top and sides of a hedge and this can be done at a much greater speed than with the hand shears or other devices at present generally used for this purpose.

If desired the arm or handle could be made of considerable length so as to reach trees or high hedges or other normally inaccessible places.

What I claim as my invention and desire to secure by Letters Patent of the United States is:—

A hedge trimmer of the character described, comprising a handle, a blade plate fixed thereto, said plate comprising two semi-circular members, one of the said members having a depressed portion at its center, the other member having a central portion fitting within the said depression and having radiating cutter blades, the upper surfaces of the said members being flush and in the same plane, means adjacent their centers for holding the said blades together, a stub shaft carried by the said blade plate, a revoluble blade plate and sprocket carried thereby, the said latter plate comprising a plurality of radiating cutter blades and a center disk fastened to said cutter blades, the said blade plates being adjacent to and operating in conjunction with each other, a sprocket wheel on the handle, a sprocket chain passing around the two sprocket wheels, a crank on the second mentioned sprocket wheel, a hand grip on the handle and a pivoted rest on the said handle, the parts arranged as and for the purpose described.

In testimony whereof I have signed this specification in the presence of two subscribing witnesses.

C. F. WAGNER.

Witnesses:
F. S. ARTHUR,
FRANK D. HANEY.